(12) United States Patent
Chen

(10) Patent No.: US 9,470,902 B2
(45) Date of Patent: Oct. 18, 2016

(54) LIGHT SOURCE MODULE USING LASERS AS LIGHT SOURCE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 778 days.

(21) Appl. No.: 13/928,819

(22) Filed: Jun. 27, 2013

(65) Prior Publication Data

US 2014/0204573 A1    Jul. 24, 2014

(30) Foreign Application Priority Data

Jan. 18, 2013   (TW) .................................. 102101875

(51) Int. Cl.
*G02B 27/28* (2006.01)

(52) U.S. Cl.
CPC .................................. *G02B 27/283* (2013.01)

(58) Field of Classification Search
CPC ...... F21Y 2101/02; F21K 9/00; F21S 4/003; F21V 5/04; F21W 2111/02; G02B 27/10; G02B 27/28; G02B 27/283; G02B 27/286; G02B 5/32; G02B 5/3083
USPC .................................................. 362/235, 244
See application file for complete search history.

(56) References Cited

U.S. PATENT DOCUMENTS

| | | | | |
|---|---|---|---|---|
| 7,839,357 B2 * | 11/2010 | Kawahara | ............ | G09G 3/2022 345/60 |
| 8,279,524 B2 * | 10/2012 | Fiolka | ...................... | G02B 1/08 355/71 |
| 8,760,664 B2 * | 6/2014 | Suehira | .................. | A61B 3/102 356/450 |

\* cited by examiner

*Primary Examiner* — Alan Cariaso
*Assistant Examiner* — Mark Tsidulko
(74) *Attorney, Agent, or Firm* — Zhigang Ma

(57) ABSTRACT

A light source module includes a double refraction prism, an optical plate, a first laser source, a second laser source, and a third laser source. A first laser beam emitted from the first laser source and a second laser beam emitted from the second laser source are mixed by the double refraction prism and these are mixed together with a third laser beam emitted from the third laser source by the optical plate.

9 Claims, 2 Drawing Sheets

LIGHT SOURCE MODULE USING LASERS AS LIGHT SOURCE

BACKGROUND

1. Technical Field

The present disclosure relates to light source modules and, particularly, to a light source module using lasers.

2. Description of Related Art

Projectors generally include a light source, a color wheel, and a digital mirror device. Light rays emitting from the light source penetrate the color wheel and project onto the digital mirror device. The digital mirror device reflects the light rays under control of image signals to modulate the light rays into optical images. However, at present, the light source is typically a halogen lamp or three light emitting diodes (LEDs), directionality of the light rays is less than satisfactory and off-axis light rays do not project on the digital mirror device and are wasted, decreasing light usage efficiency.

Therefore, it is desirable to provide a light source module, which can overcome the limitations described.

DETAILED DESCRIPTION

Embodiments of the disclosure will be described with reference to the drawings.

Figure 1:
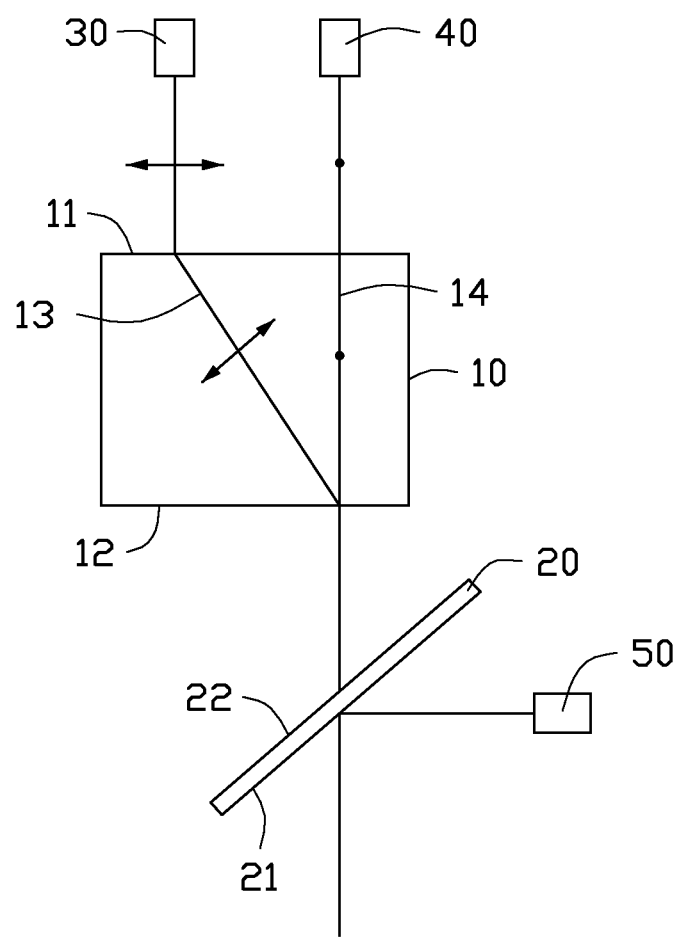
FIG. 1 is a schematic view of a light source module in accordance with a first exemplary embodiment.

FIG. 1 shows a light source module 100, according to a first exemplary embodiment. The light source module 100 includes a double refraction prism 10, an optical plate 20, a first laser source 30, a second laser source 40, and a third laser source 50. A first laser beam of a first color is emitted from the first laser source 30, a second laser beam of a second color is emitted from the second laser source 40, and a third laser beam of a third color is emitted from the third laser source 50, the first, second, and third laser beams being mixed together into a mixed laser beam.

The double refraction prism 10 is rectangular, and is made of calcite crystal. The double refraction prism 10 includes an incident surface 11 and an emergent surface 12 opposite to and parallel with the incident surface 11. The double refraction prism 10 has a fast axis 13 and a slow axis 14. The fast axis 13 and the slow axis 14 extend from the incident surface 11 to the emergent surface 12. The slow axis 14 is perpendicular to the incident surface 11 and the emergent surface 12. The fast axis 13 intersects the slow axis 14 on the emergent surface 12. An angle formed between the fast axis 13 and the slow axis 14 is $\theta$. A distance between the incident surface 11 and the emergent surface 12 is H. The light rays polarized along an S polarization direction are transmitted along the slow axis 14, and the light rays polarized along a P polarization direction are transmitted along the fast axis 13.

The optical plate 20 is made of transparent material, and includes a reflection surface 21 and a transmission surface 22 opposite to the reflection surface 21. The optical plate 20 is positioned adjacent to the double refraction prism 10, and the transmission surface 22 faces the emergent surface 12. The transmission surface 22 forms a 45 degrees angle with the emergent surface 12. In the embodiment, red light rays and green light rays projected onto the transmission surface 22 are transmitted through the reflection surface 21, and blue light rays projected on the reflection surface 21 are reflected by the reflection surface 21.

The first laser source 30 is positioned adjacent to the double refraction prism 10, and faces the incident surface 11. The first laser beam emitted from the first laser source 30 is polarized along the S polarization direction. In the embodiment, the first laser beam is a red light ray.

The second laser source 40 is positioned adjacent to the double refraction prism 10, and faces the incident surface 11. The second laser beam emitted from the second laser source 40 is polarized along the P polarization direction. A distance between the first laser source 30 and the second laser source 40 is S, wherein $\tan \theta = S/H$. In the embodiment, the second laser beam is a green light ray.

The third laser source 50 is positioned adjacent to the optical plate 20, and faces the reflection surface 21. The third laser beam emitted from the third laser source 50 is polarized along the S polarization direction and the P polarization direction. In the embodiment, the third laser beam is a blue light ray. A projection direction of the third laser beam emitted from the third laser source 50 is parallel to the emergent surface 12.

In use, the first laser beam emitted from the first laser source 30 transmits along the slow axis 14, and the second laser beam emitted from the second laser source 40 transmits along the fast axis 13. As the positional relationship of the double refraction prism 10, the first laser source 30, and the second laser source 40 satisfy the formula: $\tan \theta = S/H$, the first laser beam and the second laser beam are mixed on the emergent surface 12, and are emitted from the emergent surface 12 along a direction perpendicular to the emergent surface 12. The first and second laser beams emitted from the double refraction prism 10 project onto the transmission surface 22 and are emitted from the reflection surface 21. A projection direction of the first and second laser beams transmitted from the optical plate 20 is perpendicular to the emergent surface 12.

The third laser beam emitted from the third laser source 50 is projected onto the reflection surface 21 and is reflected by the reflection surface 21. The projection direction of the third laser beam reflected by the reflection surface 21 is perpendicular to the emergent surface 12. The first laser beam and the second laser beam transmitted from the optical plate 20 and the third laser beam reflected by the optical plate 20 are mixed together into the mixed laser beam.

Figure 2:
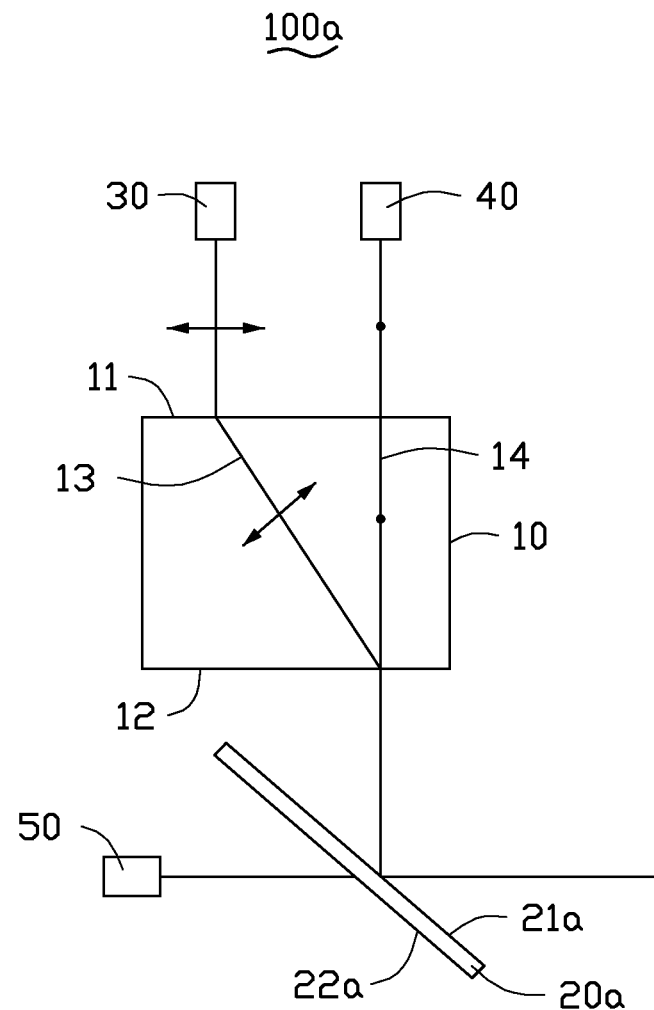
FIG. 2 is a schematic view of a light source module in accordance with a second exemplary embodiment.

FIG. 2 shows a light source module 100a, according to a second exemplary embodiment. The difference between the light source module 100a of the second exemplary embodiment and the light source module 100 of the first exemplary embodiment is that the reflection surface 21a of the optical plate 20a faces the emergent surface 12 and forms a 45 degrees angle with the emergent surface 12.

The first and second laser beams emitted from the double refraction prism 10 project onto the reflection surface 21a and are reflected by the reflection surface 21a. The projection direction of the first and second laser beams reflected by the reflection surface 21a is parallel with the emergent surface 12. The third laser beam projects onto the transmission surface 22 and is emitted from the reflection surface 21. The projection direction of the third laser beam transmitting from the optical plate 20a is parallel with the emergent surface 12. The first laser beam and the second laser beam reflected by the optical plate 20a, and the third laser beam transmitted from the optical plate 20, are mixed together into the mixed laser beam.

As the light source module 100 or 100a uses lasers as the light source, the collimation of the light rays emitted from the light source is assured. The three color lasers are mixed together by the double refraction prism 10 and the optical plate 20, 20a, and the mixing accuracy of light source module 100 or 100a is increased.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light source module, comprising:
    a double refraction prism comprising an incident surface and an emergent surface parallel with the incident surface, the double refraction prism having a fast axis and a slow axis respectively extending from the incident surface to the emergent surface;
    an optical plate positioned adjacent to the double refraction prism and facing the emergent surface;
    a first laser source facing the incident surface and emitting a first laser beam polarized along an S polarization direction;
    a second laser source facing the incident surface and emitting a second laser beam polarized along a P polarization direction, and the S polarization direction being perpendicular to the P polarization direction; and
    a third laser source facing one side of the optical plate facing away from the double refraction prism, the third laser source emitting a third laser beam;
    wherein the first laser beam and the second laser beam respectively transmit along the slow axis and the fast axis and are mixed on the emergent surface, the first and second laser beams emitting from the emergent surface and the third laser beam emitting from the third laser source mixed to a mixed laser beam by the optical plate.

2. The light source module of claim 1, wherein an angle formed between the fast axis and the slow axis is θ, a distance between the incident surface and the emergent surface is H, and a distance between the first laser source and the second laser source is S, and tan θ=S/H.

3. The light source module of claim 1, wherein the fast axis intersects the slow axis on the emergent surface.

4. The light source module of claim 1, wherein the optical plate comprises a reflection surface and a transmission surface opposite to the reflection surface, the transmission surface faces the emergent surface, and the third laser source faces the reflection surface.

5. The light source module of claim 4, wherein the first and second laser beams emitting from the emergent surface are transmitted though the optical plate, and the third laser beam emitting from the third laser is reflected by the optical plate.

6. The light source module of claim 5, wherein a projection direction of the first and second laser beams transmitting though the optical plate is perpendicular to the emergent surface, a projection direction of the third laser beam reflected by the reflection surface is perpendicular to the emergent surface.

7. The light source module of claim 1, wherein the optical plate comprises a reflection surface and a transmission surface opposite to the reflection surface, the reflection surface faces the emergent surface, and the third laser source faces the transmission surface.

8. The light source module of claim 7, wherein the first and second laser beams emitting from the emergent surface are reflected by the optical plate, and the third laser beam emitting from the third laser are transmitted through the optical plate.

9. The light source module of claim 8, wherein a projection direction of the first and second laser beams reflected by the optical plate is parallel with the emergent surface, and a projection direction of the third laser beam transmitting though the optical plate is parallel with the emergent surface.

* * * * *